US008495562B2

(12) United States Patent
Hambleton et al.

(10) Patent No.: US 8,495,562 B2
(45) Date of Patent: Jul. 23, 2013

(54) SYSTEM AND METHOD TO GRAPHICALLY FACILITATE SPEECH ENABLED USER INTERFACES

(75) Inventors: Myra Hambleton, Plano, TX (US); Charles Galles, Plano, TX (US); John Fuentes, Plano, TX (US)

(73) Assignee: Intervoice Limited Partnership, Reno, NV (US)

( * ) Notice: Subject to any disclaimer, the term of this patent is extended or adjusted under 35 U.S.C. 154(b) by 1482 days.

(21) Appl. No.: 11/958,218

(22) Filed: Dec. 17, 2007

(65) Prior Publication Data
US 2008/0098353 A1 Apr. 24, 2008

Related U.S. Application Data

(62) Division of application No. 10/428,723, filed on May 2, 2003, now Pat. No. 7,331,036.

(51) Int. Cl.
G06F 9/44 (2006.01)

(52) U.S. Cl.
USPC .................. 717/105; 717/109; 704/270.1

(58) Field of Classification Search
USPC .................................. 717/105, 109
See application file for complete search history.

(56) References Cited

U.S. PATENT DOCUMENTS

| 5,485,600 | A | 1/1996 | Joseph et al. | |
| 5,946,485 | A | 8/1999 | Weeren et al. | |
| 6,131,184 | A * | 10/2000 | Weeren et al. | 717/109 |
| 6,173,266 | B1 * | 1/2001 | Marx et al. | 704/270 |
| 6,637,022 | B1 | 10/2003 | Weeren et al. | |
| 6,718,017 | B1 | 4/2004 | Price et al. | |
| 6,751,787 | B1 | 6/2004 | Blaszczak et al. | |
| 6,888,929 | B1 | 5/2005 | Saylor et al. | |
| 6,973,625 | B1 | 12/2005 | Lupo et al. | |
| 7,031,440 | B1 * | 4/2006 | Xu | 379/88.16 |
| 7,082,392 | B1 * | 7/2006 | Butler et al. | 704/233 |
| 2002/0122541 | A1 | 9/2002 | Metcalf | |
| 2002/0184610 | A1 | 12/2002 | Chong et al. | |
| 2004/0064351 | A1 | 4/2004 | Mikurak | |
| 2004/0217986 | A1 * | 11/2004 | Hambleton et al. | 345/763 |

OTHER PUBLICATIONS

InterVoiceBrite, InVision User's Guide, 2001.*

* cited by examiner

Primary Examiner — Li B Zhen
Assistant Examiner — Lenin Paulino
(74) Attorney, Agent, or Firm — Frost Brown Todd LLC

(57) ABSTRACT

A graphical development environment for developing the program flow of an application, The environment is controlled by a plurality of icons, some of which are detailed sub-routines used to control the proper returns in systems in which speech recognition is utilized. In one embodiment, a loop construct is used with branches arranged by the sub-routine icons to ensure that a proper return is achieved based upon an expected grammar for that branch.

1 Claim, 8 Drawing Sheets

FIG. 6

| | Leg Name | Grammar Slot | Initial Value | Item Result |
|---|---|---|---|---|
| ▶ | amount | money | 62 → | transferAmount |
| | from | number1 | | fromAccount |

Form Label: askFundsTransfer
Initial Prompt: 501 ▼ Say the amount and account for funds transfer.

Fields Recognized:
63  64

Insert Line
Append Line
Delete Line 64  65  66  67
Grammar | Properties | Events | Inline NoMatch: 601 ─ (Inline Exception) ▼
NoInput: (Inline Exception) ▼
Error: SpeechErrorException_ ▼
Confirm: (None) ▼
Confirm Universal: (None) ▼
Confirm Navigation: (None) ▼

Assign detail result to: FundsTransferDetailOrderedCollection |

FIG. 8
(PRIOR ART)

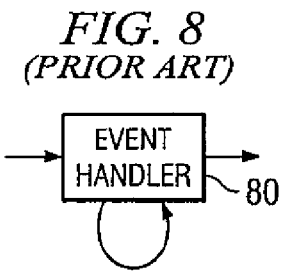

FIG. 9A

```
<form id="tapered">
 <block>
  <prompt bargein="false"> Welcome to the ice cream survey.</prompt>
 </block>
 <field name="flavor">
  <grammar>vanilla | chocolate | strawberry</grammar>
  <prompt count="1">What is your favorite flavor?</prompt>
  <prompt count="3">Say chocolate, vanilla, or strawberry.</prompt>
  <help>Sorry, no help is available.</help>
 </field>
</form>
```

FIG. 9B

```
<form id="get_from_and_to_cities">
  <grammar src="http://www.directions.example/grammars/from_to.gram"/>
  <block> Welcome to the Driving Directions By Phone.</block>
  <initial name="bypass_init">
    <prompt> Where do you want to drive from and to?</prompt>
    <nomatch count="1">Please say something like "from Atlanta Georgia to Toledo Ohio".</nomatch>
    <nomatch count="2"> I'm sorry, I still don't understand. I'll ask you for
information one piece at a time.
      <assign name="bypass_init"expr="true"/>
      <reprompt/>
    </nomatch>
  </initial>
  <field name="from_city">
    <grammar src="http://www.directions.example/grammars/city.gram"/>
    <prompt>From which city are you leaving?</prompt> ... etc. ...
  </field> ... etc. ...
</form>
```

SYSTEM AND METHOD TO GRAPHICALLY FACILITATE SPEECH ENABLED USER INTERFACES

CROSS-REFERENCE TO RELATED APPLICATIONS

This application is a divisional of U.S. patent application Ser. No. 10/428,723, entitled, "SYSTEM AND METHOD TO GRAPHICALLY FACILITATE SPEECH ENABLED USER INTERFACES", filed May 2, 2003, the disclosure of which is hereby incorporated by reference herein.

This application is related to concurrently filed, co-pending, and commonly assigned U.S. application Ser. No. 10/429,011, entitled "ENHANCED GRAPHICAL DEVELOPMENT ENVIRONMENT FOR CONTROLLING MIXED INITIATIVE APPLICATIONS;" commonly assigned U.S. application Ser. No. 09/687,296, filed Oct. 13, 2000, entitled "GRAPHICAL PROGRAMMING LANGUAGE FOR REPRESENTATIONS OF CONCURRENT OPERATIONS;" and commonly assigned U.S. application Ser. No. 09/603,334, filed Jun. 26, 2000, entitled "ENHANCED GRAPHICAL DEVELOPMENT ENVIRONMENT FOR CONTROLLING PROGRAM FLOW," the disclosures of which are hereby incorporated herein by reference.

TECHNICAL FIELD

This invention relates to interactive voice response systems and more particularly to systems and methods for facilitating speech recognition code generation into applications.

BACKGROUND OF THE INVENTION

Interactive voice response (IVR) systems have been in use for some time now. Typically, such systems operate such that a calling (or called) user is asked a series of questions and is prompted to give a response. At first, these responses were accomplished by the user touching a keypad number. In such systems the calling (or called) user would be prompted as follows: "Please touch one for today's flights and touch two for all other flight information."

More recent system allow the user to answer verbally. Thus the user prompts for such systems would be: "Please say one for today's flights and say two for all other flight information." An alternate prompt would be: "Please say yes if you are flying today and no if you are flying any other day." Another alternate prompt would be: "Say the time you would like to fly." The user would be expected to respond with, "this morning" or "five p.m."

The designer of such systems must code each application such that it follows a specific script, or call flow. Tools, including graphical tools using icons, are typically used for such application call flow coding. One example of such a tool is shown in U.S. Pat. No. 5,946,485, dated Aug. 31, 1999; and U.S. Pat. No. 6,131,184, dated Oct. 10, 2000, both of which are incorporated by reference herein.

In such prior art call flow tools, icons are used to illustrate for the designer the pertinent details of the call flow so that the designer could rearrange the call flow, or insert other paths or options into the call flow. Thus, in the prior art there is a single icon such as icon 80, shown in FIG. 8, that a user places in the call flow that represents the entire event recognition call flow. The designer could supply several parameters that are used in defining the particular event to be recognized. However, in order to change the event recognition format, a designer would have to add code to vary the structure or process which is to be followed by the standard event handled icon. In the prior art, a single icon represents a single recognition event including all actions leading to resolution of that recognition event.

Recently, IVR systems have begun to incorporate more complex caller voice recognition events, so that the caller might now hear the following prompt: "Please tell me your flight date and destination city." These more complex types of recognition events are more difficult to program and to represent by a single icon.

Caller (talker) directed systems rely on the recognition of various responses from the calling (or called) user and can be as free-flowing as desired. Thus, a prompt could be: "Please tell me what I can do for you today." A more typical prompt would be more specific, such as: "Please tell me what day you are flying and what flight number you are asking about."

With the current state of the art, the application designer would code each of these scenarios to respond to the talker's answers. Speech recognition is then used to determine what the talker has responded. The graphical icon application tools do not work well for speech recognition applications. Today in the industry, a recognition event is handled by defining everything inside a single icon. All events that control a recognition event are packaged into a single icon. Although these icon tools exist today to provide macro level directed dialogue snipped graphically, the user does not have control to vary or supplement those singular events, except through extensive supplemental coding.

The call flow in speech recognition applications relies on the generation and ultimately the recognition of certain grammars. Each grammar is a collection of phrases that are passed to a system component. The system component then "listens" to the user input to determine if the user spoke one of the defined phrases. If the user speaks one of those phrases, that phrase is passed back to the application for subsequent processing within the call flow. However, the calling (or called) user could respond with a word or phrase which is out of context. Or in multiple response situations (such as "what day and time are you flying?") the system must know and process both responses before the next step is achieved. Establishing the code and call flow processing for situations such as this, is difficult and time consuming, and would have to be repeated for each application and for any changes required in an application.

In the state of the art today, the user can code for the return of specific words or responses. FIGS. 9A and 9B show such coding for a simple situation for single-slot returns and multi-slot returns, respectively. As shown in FIGS. 9A and 9B, there are carats surrounding code words, and the designer must parse through the code in order to understand the operation of the call flow so that desired changes can be made. This coding is graphically cumbersome and the applications become formidable. In existing graphic packages, the prompts which hold onto the grammar definition, including the prompts, the timers, the possible behavioral responses, are woven tightly into what is called the 'tool kit,' and graphical constructs to represent such alternative coding is not available.

SUMMARY OF THE INVENTION

The present invention is directed to a system and method which incorporates into a graphical call flow tool the ability to establish call flow routines which utilize voice recognition. By representation of each individual element or step of the event handling process as individual icons, the system allows the designer to customize the call flow without extensive modification to the existing code. In essence, the prior art single, all-inclusive icon has been opened up into multiple, individual icons that represent each step of the event handling process. It is a "reverse" abstraction, bringing a higher degree of detail to the user for a higher degree of ultimate control and customization.

Our system and method, in one embodiment, relies on what we call a multi-slot return and how that multi-slot return is graphically illustrated to a system designer. Included in the graphical process is a loop to ensure that each response has been returned properly and that the responses to a specific question have been returned A single-slot return occurs when a single response is expected from a question and a multi-slot response occurs when more than one item is to be determined from a single question.

In one embodiment, we graphically define the recognition event as well as the grammar definition event in a manner that exposes the call flow by showing the behaviors associated with the recognition events. The system and method allows the user the freedom of coding all the behaviors and actually displaying the behaviors that they code in the graphical drawing space.

By glancing at the graphical display, as opposed to reading through all of the code, the designer can see the call flow and thereby understand the call flow behavior. The system and method also facilitates modifications because the changes become simple changes to the graphical illustration. A designer then can easily add make slight changes to a message, or change a loop so that it processes three times instead of four times.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIGS. 5, 6, and 7 show examples of graphical forms used to establish and control call flows;

FIG. 8 shows a representation of a prior art icon; and

FIGS. 9A and 9B show existing methods of coding single- and multi-slot grammar returns.

DETAILED DESCRIPTION OF THE INVENTION

In the discussion that is to follow the term grammar is used to mean a phrase, or collection of phrases, that is stored in anticipation of a calling (or called) user uttering one of those phases in response to a question presented to the calling (or called) user. Thus, if the presented question is "What is your favorite color?", the 'grammar' would consist of a list of colors. In response to the question: "What is your favorite color?" the user could name a color. The speech containing the color utterance would then be passed to the component that matches the received utterance (grammar) with the pre-stored grammar. If the answer matches any of the items in the prestored grammar then a valid indication is passed back to the application together with the color response in coded form. Also passed back to the system, is a code representing the level of confidence the system has in knowing which color was uttered. If the answer does not match the presented question (i.e., the talker said "hot"), or if the confidence level is below an acceptable threshold, then a mismatch condition occurs. The mismatch could be because the talker answered by naming a color not on the list, or the talker could have spoken a word or phase out of context, or a no-input condition could have occurred if the talker did not speak at all.

Figure 1:
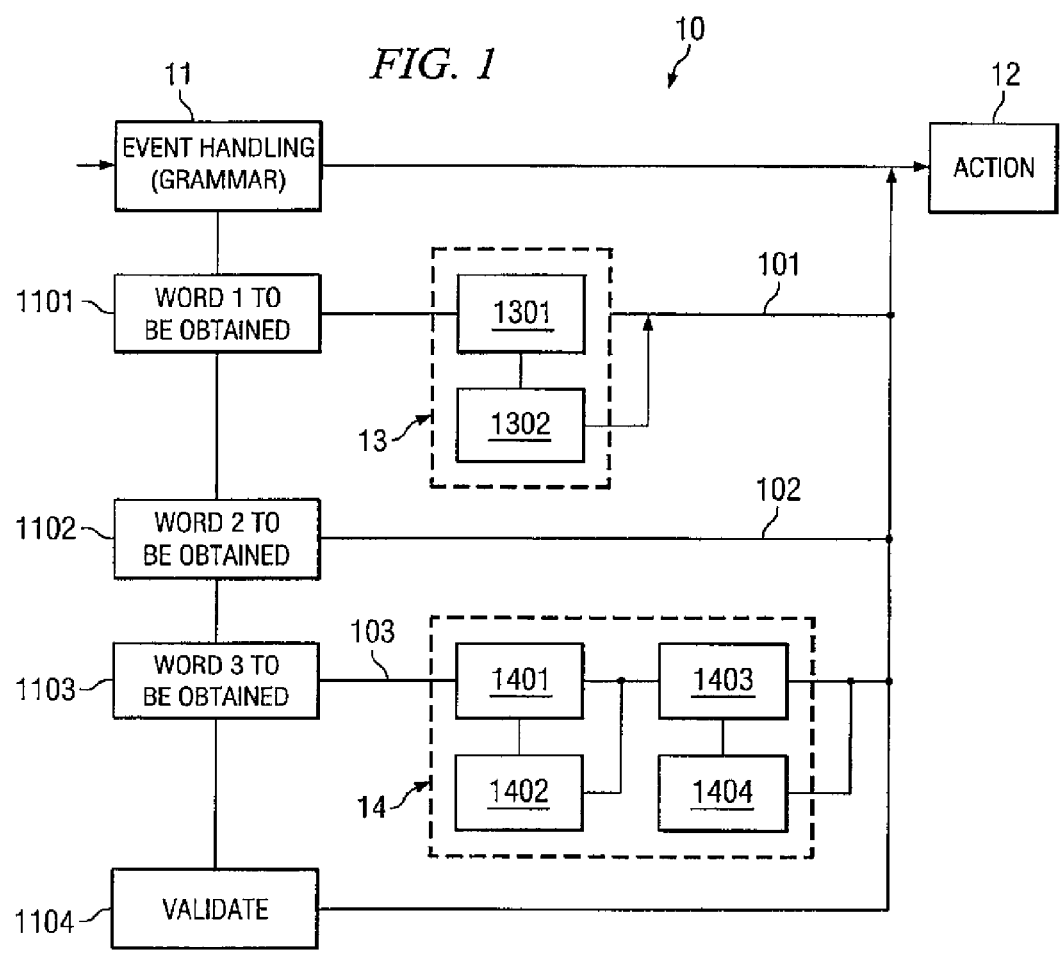
FIG. 1 show an embodiment of the concept of the invention.

FIG. 1 shows one embodiment of a system and method in which the icons are broken into smaller individual elements so that they can be "phased" where desired to form any call flow form.

Icon 11 would be a main icon which would control the question presented to a calling (or called) user (sometimes herein referred to as the talker). This icon will control the response from the talker. Any such response is fed to action icon 12 for processing in accordance with a grammar established for icon 11.

Icons 1101, 1102, 1103, 1104 form a loop such that each such icon controls, for example, one of the responses expected from a user. These responses (words) can be, for example, day, time, city, etc. Each leg of the loop, such as legs 101, 102, 103 can have sub loops, such as sub loops 13, 14. Each of the such loops, in turn, can have icons controlling different responses or actions, such as no-input, no-match, etc.

Validation leg 1104, as will be discussed, forces all of the legs to obtain responses before going to a next phase of the call flow.

The operation of the system and method of FIG. 1 will now be discussed with reference to FIGS. 2, 3 and 4.

Figure 2:
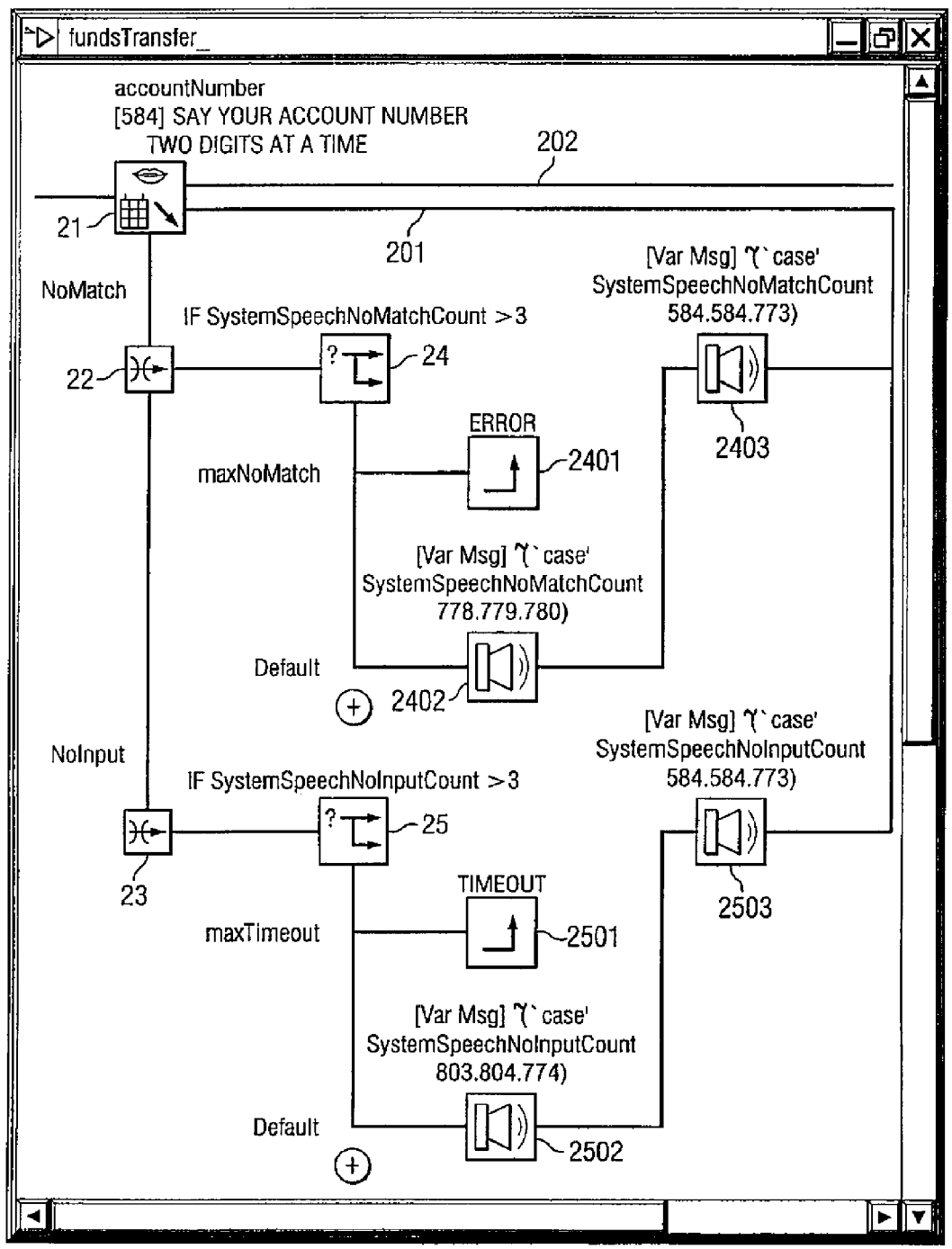
FIG. 2 shows a single slot graphical display of a 'no match', 'no input' loop.

Turning now to FIG. 2, icon 21 shows what the prompt would be for one branch, branch 20, of the call flow. FIG. 2 shows primarily the no match, no input portions of the call flow in a graphical manner.

Icon 21 is a user prompt asking the user to state the desired account number two digits at a time. The spoken response from the talker is passed to voice recognition components (not shown) over path 202. At this point, for this presented question, the grammar has been preset, and consists of numbers.

The system graphically displays the processing of the call flow when a word outside of the grammar is spoken, which is the no-match situation. The no-match display shows two possibilities; a mismatch 22 and a no-input 23. As discussed above, when the talker responds with a word outside of the grammar, as shown by icon 22, there is a mismatch condition. When no input is detected, as shown by icon 23, there is a no-input condition. In each of these conditions, the designer can define the subroutines that will be followed.

Icon 24 establishes how many times the user will be prompted to restate his/her account number for the no match condition. This number can be different than for the no input condition, if desired. The designer can change the retry from three (for example) to any desired number of retries. If the maximum number of retries has occurred, the system returns an error, via icon 2401, to the application.

If the set number of retries has not been met, then icons 2402 and 2403 control the message that is replayed to the talking party. These messages can be changed, if desired, each time so that the calling party does not repeatedly receive the same message. Again, the designer can modify the call flow, since the routine being followed is not buried within a single icon but is separately identified and available. For example, the message played to the caller can be based on the number of retries or on some other factor, and could include the use of databases and other table lookups.

Icon 23 handles the timeout condition where no input is received. The display shows the processing that could occur if the user does not respond at all to the recognition event, i.e. the user prompt.

Path 201 is a looping construct. The display shows lines that represent the behavior of looping which is back around to prompting icon 21. The designer, using the system and method discussed, may, if desired, break the loop. This break could result in a call going to an operator, or a simple hang-up, or by a message being played to the caller telling the caller that the session is being terminated.

The no-input process call flow follows the same general approach as does the no-match call flow. Icon 25 receives a no-input signal from the underlying components (not shown) and in response thereto either timeouts, icon 2501, if the number of tries exceeds the set limit, or plays a message via icons 2502 and 2503 as discussed above.

Figure 3:
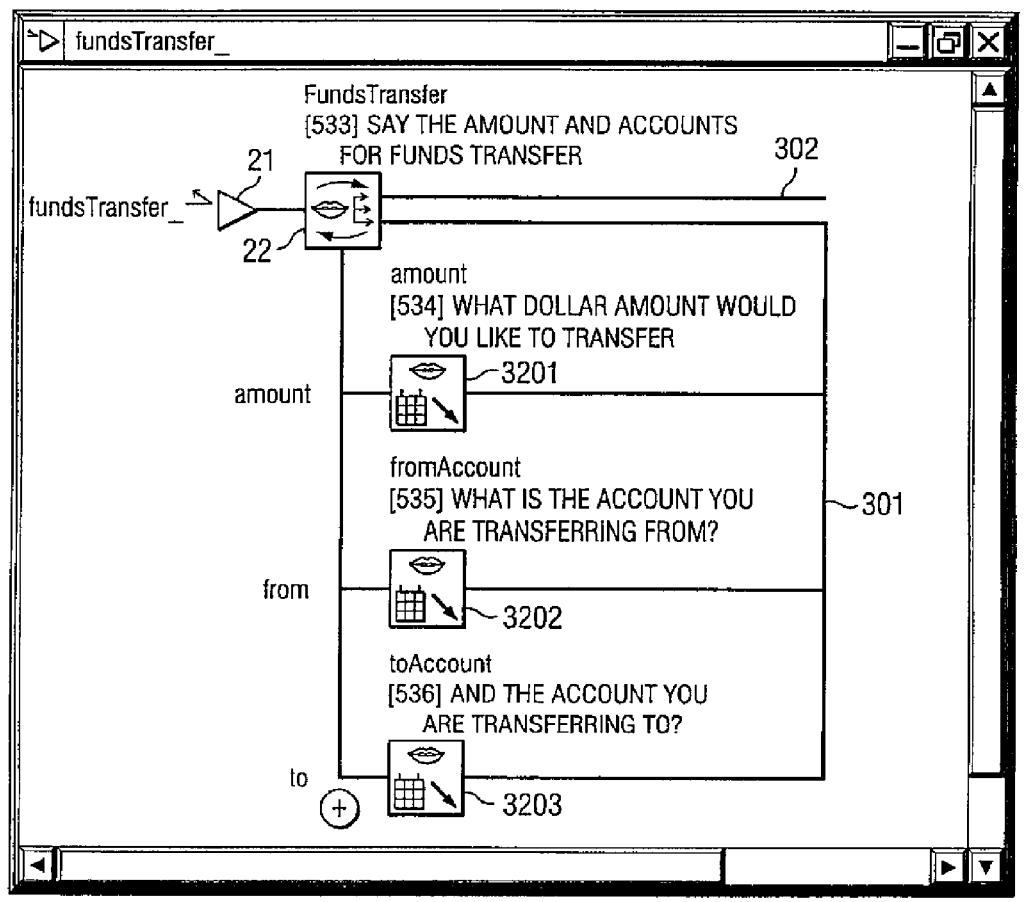
FIG. 3 shows a multi-slot graphical display of match conditions.

Turning now to FIG. 3 there is shown call flow display 30 which is an example of a multiple slot call flow. In the multiple slot call flow there is defined a set of grammars which together can return to the application more than one piece of information. FIG. 3 shows a funds transfer recognition event using a compound question having multiple portions to be answered. Icon 32 might ask: "Please say the amount of funds to be transferred, the account from which you want the funds taken, and the account into which you want the funds placed." In response to this compound question, the caller (talker) might answer all portions of the question by saying: "I want to transfer $500.00 from my checking account to my savings account."

The application, when it hears such a sentence, would need to extract the portions, such as 'amount', the 'from' account, and the 'to' account. So multiple pieces of information need to come back from the grammar recognizer when that sentence is received.

FIG. 3 graphically displays an example of the legs that would be used. Each leg, shown by icons 3201, 3202 and 3203 is essentially a single-slot call flow as discussed in FIGS. 1 and 2.

For example, assume the talker said, "I want to transfer from my checking account to my savings account," but did not say the amount portion. In this situation, the speech recognizer would return the word "checking" to icon 3202, the word "savings" to icon 3203, and slot 3201 would remain empty. The system would come down the amount leg where it would encounter the single slot recognition event icon 3201 that asks: "What dollar amount would you like to transfer?" Assuming the caller then says the amount, the system progresses. If the caller does not answer, or answers with a word outside of the grammar, then, depending upon the repeat number, the system would timeout and terminate the call as discussed above with respect to FIG. 2.

Again, it should be noted that this is a looping construct, so the system would not leave call flow 30 until all of the values are filled. This system and method then saves the programmer from writing code because the code to control the desired routines is included in the icons that are positioned by the designer in accordance with that call flow.

Figure 4:
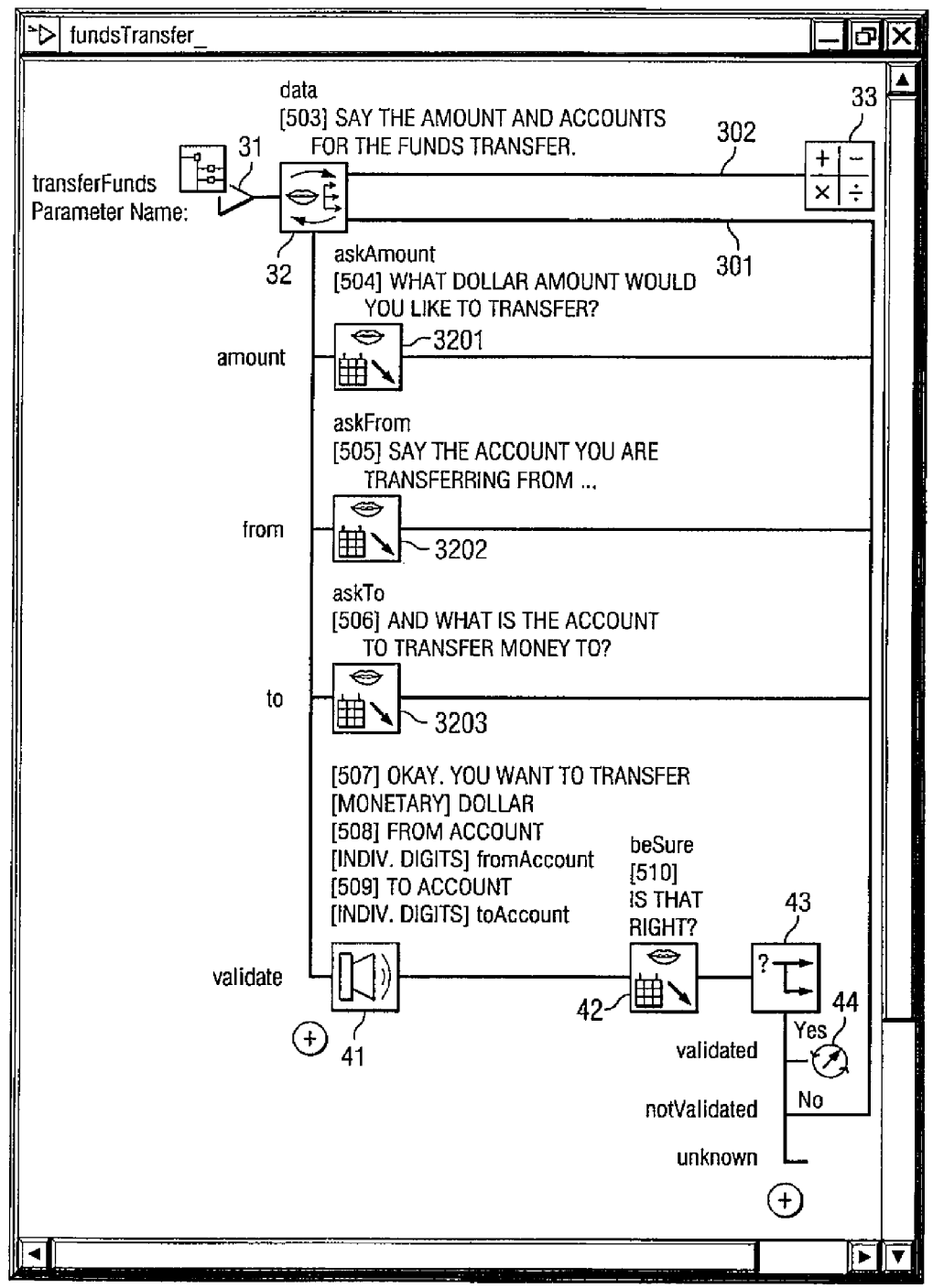
FIG. 4 shows the validation loop.

FIG. 4 shows call flow 40 which illustrates the validation process. Call flow 40 is essentially the same as call flow 10 (FIG. 1), except that a leg has been added starting with icon 41 and including icons 42, 43, and 44. Call flow 40 follows the form shown in FIG. 1.

Within leg 41, a slot is defined that is never filled by the talker since it actually is used only when the legs are all filled. Icon 41 will repeat to the caller what the caller has requested, by saying, "Do you want to transfer $500 from account XXXX to account YYYY?" Icons 42 and 43 verify that the caller has answered with the proper grammar, such as "yes", "okay," or an equivalent affirmative response. If the transfer is validated, icon 44 controls the flow of information to the proper location so as to control the transfer. If the transaction is not verified, then the system loops back and restarts.

Figure 5:
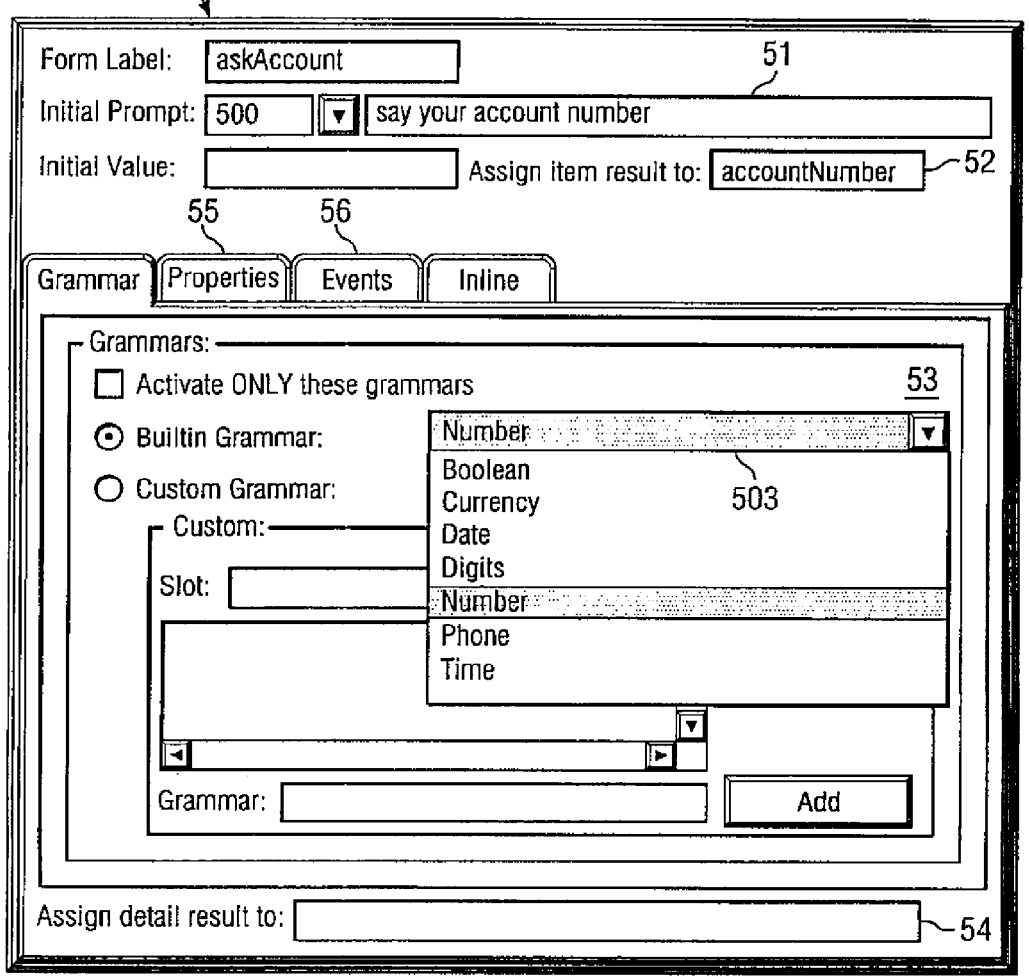

FIGS. 5 and 6 show one graphical representation of the implementation of FIGS. 1-4. FIG. 5, shows form 50 which deals with single fields and allows a user to indicate an initial prompt, such as "Say your account number," 51. The variable 52 is identified that will hold the recognition results. Field 53 allows the user to pick a grammar that is going to be active for the recognition instance defined by the form, or, if desired, the user can write his/her own grammar(s). There is a list on the form to support customizations and there can be as many grammars active as desired for this recognition instance. In the example, "number" grammar 503 is selected.

Form 50 also provides field 54 to hold the detail recognition results when necessary. The detail recognition results allow the user to obtain as much information as possible about the result. For example, the confidence scores for a particular recognition event and other details are available to allow the user specific processing. Thus, for any particular recognition event, the user can take the high road and trust the recognizer to provide the right piece of information or the user can take the detail road and base his/her next action on the level of detail (for example, confidence level).

In addition, form 50 will allow specific properties 55 to be passed to the recognizer. For example, when an account number is being requested, the recognition engine could be told the length of the number to expect.

Events field 56 is used to control selected events, such as, for example, time out. The user can determine the type of processing desired when a time out occurs. Also, the user can invoke a global definition, (time period), or can provide a specific period for this instance of recognition.

Sometimes a responding user (talker) says something that does not fit into the grammar. This is a no-match condition. The programming user might want to do something specific for a no match, such as providing a prompt with an example in it. The programming user might want to continue the answer. For example, if the recognizer believes it understood what was said, but is only 50% certain, the application can then play back the perceived value and then "listening" for a 'yes' or 'no.'

Another type of property is confirmation thresholds themselves. What percentage of certainty is going to cause the confirmed leg to be executed as a recognition? Thus, a programmer can at every instances of speech recognition indicate what percent certainty will be tolerated at that point. For example, it is harder to recognize 123ABC, than it is to recognize Sally, a prompt name. The programmer might raise the confirmation thresholds when recognizing certain types of grammars. That is a benefit of having these properties and having them be instance related.

FIG. 6 shows from 60 which is used for multiple fields which are essentially complex prompts where the application is expecting multiple pieces of information to come back from the talker. This is shown in FIGS. 1-4 graphically. Form 60 gives the programmer the ability to define the initial prompt 61 and to define the variable 62 that is going to hold the phrase. This associates the phrase result with the slot value 63 inside a grammar because there is one grammar file that understands the entire phrase that is expected. When the event recognizer understands multiple pieces of information, it passes back that information to the application, using slots. Column 64 is called Initial Value and is used when the application already knows a particular value. Column 62 is empty on the form but let's assume a variable is put there called "My Money." When the application is being executed and My Money has a value, then the system need not try to interpret what is said, and need not even ask the question. This is a programming construct that simplifies the amount of code needed. If the field is populated with a specific value instead of having the system say, "speak the amount for funds transfer," the system begins by saying, "What account would you like to transfer $XX dollars from?"

Figure 7:
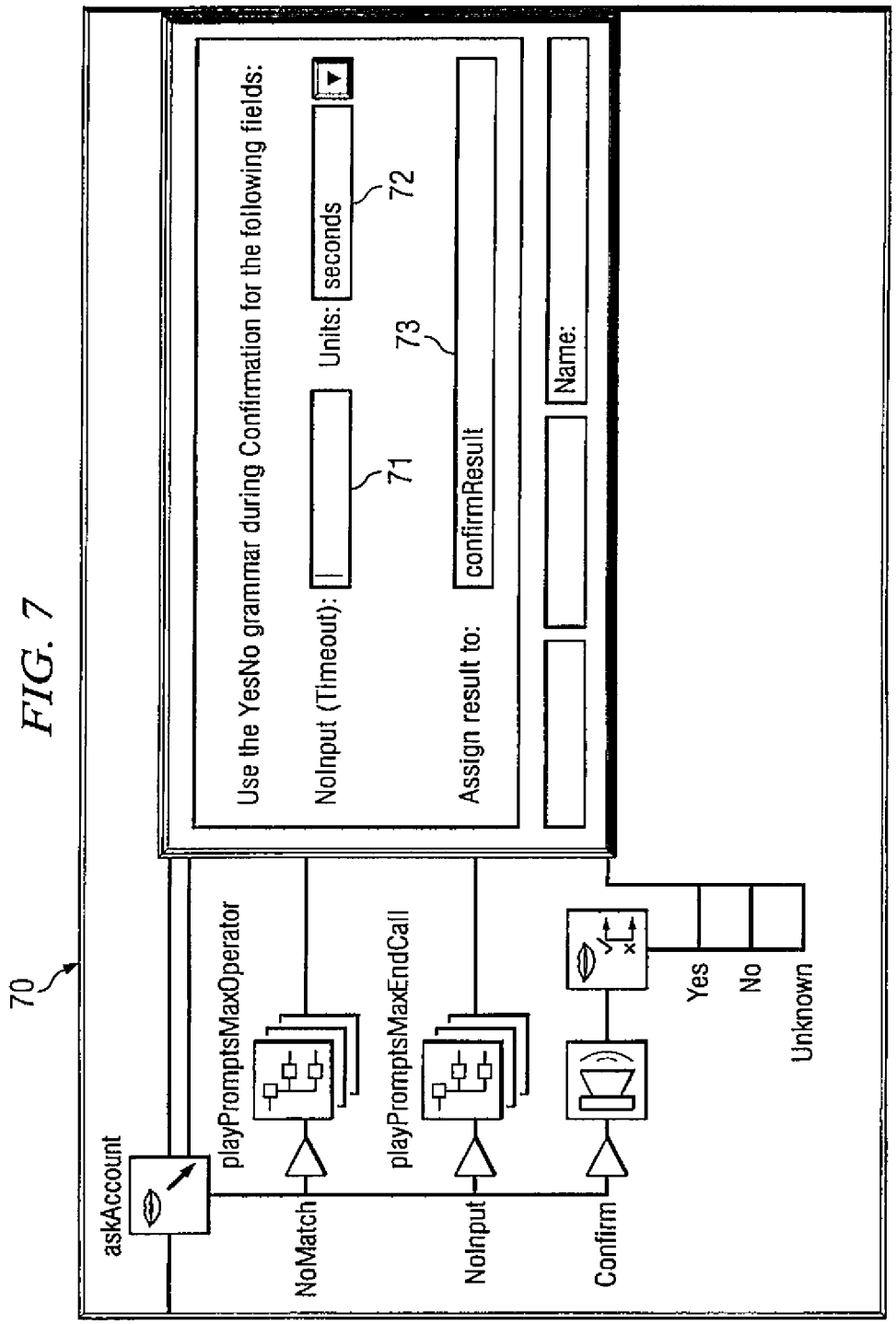

FIG. 7 shows confirmation form 70 which controls as validation icons 41 and 43 (FIG. 4). The legs on it are Yes, No and Unknown. Form 70 contains parameters that define the time out value 71, and the units for the time out 72, and the results 73, which is the string of Yes, No, or an Unknown value. The reason for using a confirmation form is that the form forces the automatic changing of the grammar for further processing. For example, if an answer has been received and the question asked in return is, "Did you say, 1, 2, 3, 4, 5?". Then, if the talker says no, the system knows that 1, 2, 3, 4, 5 is an invalid answer and those numbers (or words or phrases) are removed form the grammar for the next try. So what it means is that by using this form, the next recognition event should have improved results. This process can be applied, for example, to a 'name' grammar. Assume the grammar contains a bunch of names, including Mabel, Mildred, Manny. Assume also that in response to the question, "Who are you calling?", the talker says, "mumble, mumble." The system then says, "Did you say Mabel?". The talker's response is "No." The system could then remove Mabel from the grammar and ask the talker to repeat the name.

The selection of grammars, or the elimination of certain words from a grammar, can be very helpful. For example, assuming name recognition and assuming a male name grammar, a female name grammar and a generic name grammar. In response to a received name the recognizer returns a low confidence score, but reports that it is more confident that it was a female name and not a male name.

In this situation, the caller can be asked to repeat the name, but this time the male and generic grammars are off. Also, it could be that the name with the highest confidence score is Sam, but the recognizer indicates that it has a high confidence (perhaps based on other characteristics or other information) that the speaker name is a female name. Then the system would accept the female name with the highest confidence score, even though a male name (Sam) had a higher absolute score. The male-female confidence level could come from many sources, including a database of expected results dependant on other known results, or the speech itself could yield clues. Examples of such clues could be a speech pattern or power, or frequency components of the speech.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   a) in a graphical development environment provided by a computer system comprising a display, displaying a first icon, wherein:
      i) the first icon corresponds to a first prompt to be provided to a user by an automated system during an interaction with the automated system; and
      ii) the first prompt requests the first piece of information from the user and a second piece of information from the user;
   b) in the graphical development environment, displaying a second icon, wherein:
      i) the second icon corresponds to a second prompt to be provided to the user by the automated system during the interaction with the automated system only if the first prompt is provided to the user by the automated system during the interaction with the user; and
      ii) the second prompt requests only the first piece of information from the user and is provided to the user by the automated system during the interaction with the automated system if and only if:
         i) the first prompt is provided to the user by the automated system during the interaction with the user; and
         ii) the first piece of information is not recognized in a response by the user to the first prompt;
   c) in the graphical development environment, displaying a third icon, wherein:
      i) the third icon corresponds to a third prompt to be provided to the user by the automated system during the interaction with the automated system if and only if:
         the first prompt is provided to the user by the automated system during the interaction with the user; and
         the second piece of information is not recognized in a response by the user to the first prompt; and
      ii) the third prompt requests only the second piece of information from the user; and
   d) wherein the first icon and the second icon are displayed simultaneously by the computer system, and the first prompt, the second prompt and the third prompt are displayed simultaneously by the computer system.

* * * * *